US011636780B2

United States Patent
Keller et al.

(10) Patent No.: US 11,636,780 B2
(45) Date of Patent: Apr. 25, 2023

(54) FLEXIBLE BRAILLE INDICIA SIGNAGE FOR USE ON RAILINGS AND METHOD

(71) Applicant: Graphic Imaging, Inc., Pipersville, PA (US)

(72) Inventors: Katherine Anne Keller, Pipersville, PA (US); Ryan Herrmann Keller, Pipersville, PA (US); Jesse James Scandlin, Pipersville, PA (US); Kenneth Albert Bucker, Pipersville, PA (US)

(73) Assignee: GRAPHIC IMAGING, INC., Pipersville, PA (US)

( * ) Notice: Subject to any disclaimer, the term of this patent is extended or adjusted under 35 U.S.C. 154(b) by 1015 days.

(21) Appl. No.: 16/412,931

(22) Filed: May 15, 2019

(65) Prior Publication Data
US 2020/0365055 A1 Nov. 19, 2020

(51) Int. Cl.
*G09F 7/12* (2006.01)
*G09B 21/00* (2006.01)
(Continued)

(52) U.S. Cl.
CPC ............ *G09B 21/003* (2013.01); *B41M 3/16* (2013.01); *G09F 7/12* (2013.01); *G09F 23/00* (2013.01); *G09F 2007/127* (2013.01)

(58) Field of Classification Search
CPC ........ G09B 21/003; B41M 3/16; G09F 23/00; G09F 2007/0127
See application file for complete search history.

(56) References Cited

U.S. PATENT DOCUMENTS 5,065,837 A * 11/1991 Szudy ................. G09B 21/003
116/DIG. 17
5,366,050 A * 11/1994 Raynes ................ G09B 21/003
182/230
(Continued)

FOREIGN PATENT DOCUMENTS

JP H1152841 A * 2/1999

OTHER PUBLICATIONS

Safety Data Sheet. Roland. ECO-UV,EUV-BK Ver. 2. Version US_4.3. Aug. 30, 2017. 8 pp.
(Continued)

*Primary Examiner* — Gary C Hoge
(74) *Attorney, Agent, or Firm* — Volpe Koenig

(57) ABSTRACT

Flexible braille indicia signage and methods are provided. Preferably, the flexible braille indicia signage takes the form of braille directional identifiers for use on railings or the like. In one example, the braille indicia signage is made by providing a flexible substrate and printing a first layer of ink on a first side of the flexible substrate in a pattern defining desired braille indicia. Multiple layers of ink are then printed in registration with the pattern atop of the first layer of ink such that the desired braille indicia has a height of at least 0.6 mm (0.79 mm for braille directional identifiers) relative to the first side of the substrate. A sealing layer of ink is then printed atop the substrate and multiple layers of ink. The result is a braille sign with braille indicia that does not separate from the substrate on a condition that a portion of the substrate bearing the braille indicia is flexed in an arc of a 10 mm, i.e. 7/16 inch, radius circle, such as, for example, when the braille indicia sign is a braille directional identifier affixed to a railing having a 20 mm, i.e. 7/8 inch, or greater diameter.

20 Claims, 2 Drawing Sheets

(51) Int. Cl.
*B41M 3/16* (2006.01)
*G09F 23/00* (2006.01)

(56) References Cited

U.S. PATENT DOCUMENTS

| | | | | |
|---|---|---|---|---|
| 2004/0016796 | A1* | 1/2004 | Hanna | G07D 11/14 |
| | | | | 705/64 |
| 2005/0281600 | A1* | 12/2005 | Akaiwa | B41J 3/407 |
| | | | | 400/109.1 |
| 2010/0053287 | A1* | 3/2010 | Belelie | B41M 7/0081 |
| | | | | 347/100 |
| 2010/0055407 | A1* | 3/2010 | Belelie | C09D 11/34 |
| | | | | 428/172 |
| 2010/0055415 | A1* | 3/2010 | Belelie | C09D 11/101 |
| | | | | 427/160 |
| 2011/0103864 | A1* | 5/2011 | Guo | B41J 11/00214 |
| | | | | 400/109.1 |
| 2013/0101804 | A1* | 4/2013 | Brokken | H01L 41/04 |
| | | | | 427/256 |
| 2017/0195522 | A1* | 7/2017 | Suzuki | B41J 2/01 |
| 2017/0203597 | A1* | 7/2017 | Chopra | B41J 3/32 |
| 2018/0326769 | A1* | 11/2018 | Nariyama | H04N 1/12 |
| 2019/0061374 | A1* | 2/2019 | Kanai | G09B 21/003 |

OTHER PUBLICATIONS

Safety Data Sheet. Roland. ECO-UV,EUV-GL Ver. 2. Version US_4.3. Aug. 30, 2017. 8 pp.
3M Architectural Markets featuring 3M DI-NOC Architectural Finishes. 3M. Technical Data Sheet DI-NOC. May 2013. 6 pp.

\* cited by examiner

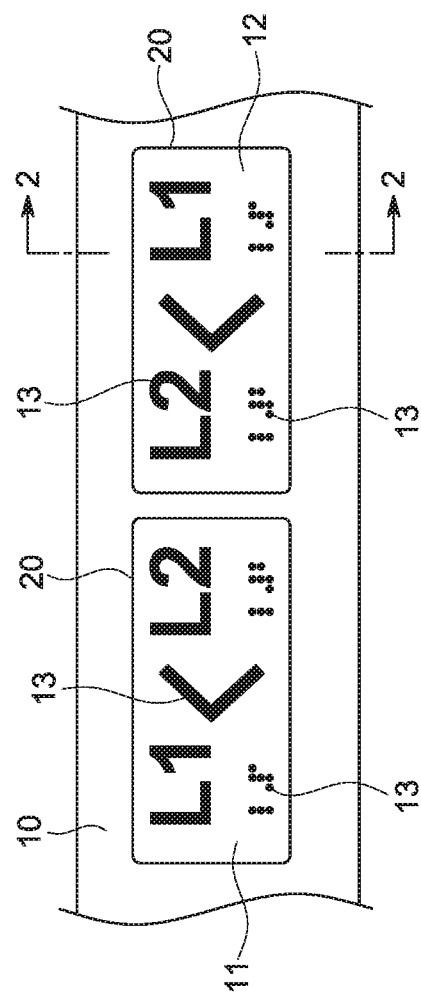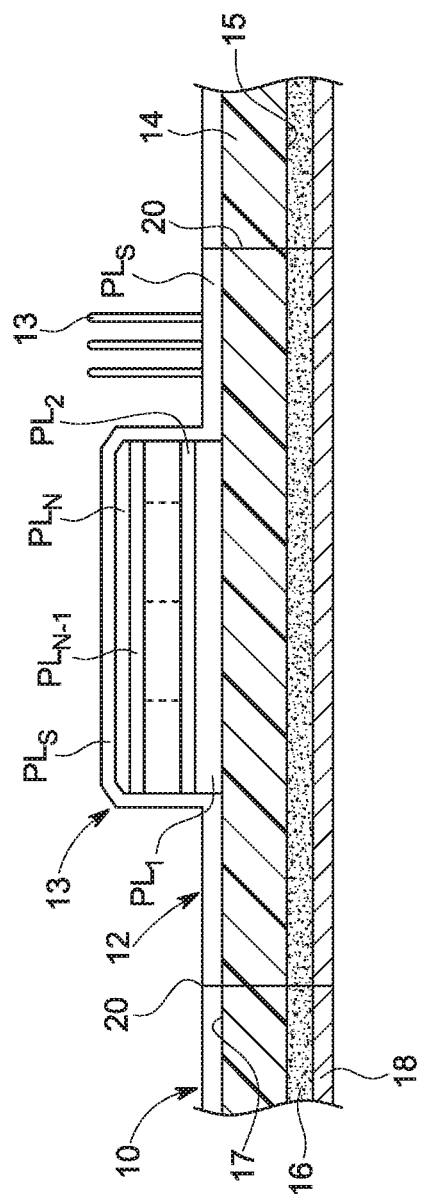

FLEXIBLE BRAILLE INDICIA SIGNAGE FOR USE ON RAILINGS AND METHOD

FIELD OF INVENTION

The present invention generally relates to providing flexible braille indicia signage, such as flexible braille directional identifiers for use on railings and the like.

BACKGROUND

Braille indicia signage has been widely employed to assist visually impaired persons. The Americans with Disabilities Act of 1990 (ADA) has mandated the use of Braille and raised character signage for elevators to provide indications of the floors of a building which an elevator serves to assist vision-impaired persons with navigation in buildings.

The inventors have recognized that it would be beneficial to provide braille indicia signage for use on railings and the like to similarly assist vision-impaired persons with navigation in buildings via stairways. In particular, in the event of an emergency evacuation of a building when elevators are inoperable, such signage in emergency exit stairwells can serve to greatly assist in evacuations, particularly when smoke or other conditions impair the vision of normally sighted persons.

Although new railings may be manufactured with braille indicia included, the inventors have further recognized that it would be beneficial to provide braille indicia signage for use on existing railings where the braille indicia signage can readily conform to the shape of the existing railing when installed.

SUMMARY

Flexible braille indicia signage and methods are provided. Preferably, the flexible braille indicia signage takes the form of braille directional identifiers for use on railings and the like.

In one example, the braille indicia signage is made by providing a flexible substrate and printing a first layer of ink on a first side of the flexible substrate in a pattern defining desired braille indicia. Multiple layers of ink are then printed in registration with the pattern atop of the first layer of ink such that the desired braille indicia has a height of at least 0.6 mm relative to the first side of the substrate. A sealing layer of ink is then printed atop the substrate and multiple layers of ink. The result is a braille sign with braille indicia that does not separate from the substrate on a condition that a portion of the substrate bearing the braille indicia is flexed in an arc of a 10 mm, i.e. 7/16 inch, radius circle, such as, for example, when the braille indicia sign is a braille directional identifier affixed to a railing having a 20 mm, i.e. 7/8 inch, or greater diameter.

The printing of the first layer of ink is preferably performed in a matte finish with ultra-violet curable ink. The printing the multiple layers of ink and the printing the sealing layer of ink are preferably performed with ultra-violet curable ink in an embossing finish.

In one example, the printing multiple layers of ink in registration with the pattern atop of the first layer of ink is performed in seven layers such that the braille indicia has a height of about 0.79 mm, i.e. 1/32 inch. In another example, the printing multiple layers of ink in registration with the pattern atop of the first layer of ink is performed in fifteen layers such that the braille indicia has a height of about 1.58 mm, i.e. 1/16 inch.

The substrate can be made of one of a DI-NOC™ architectural finish or a material with equivalent strength and flexibility properties. For use, the substrate is formed into a selectively sized tactile sign with the desired braille indicia thereon.

The substrate can include an adhesive on a second side covered by a removable backing further. In such case, the tactile sign can take the form of a braille directional identifier and be affixed to a railing by removing the backing and using the adhesive to affix the identifier. Other conventional manners of affixation of the tactile sign can be used where no adhesive backing is provided on the substrate.

The printing of the first layer of ink can be performed in a matte finish with ultra-violet curable ink with the printing of the sealing layer of ink performed with a clear ink and the printing of at least one of the multiple layers of ink performed with an ink of a desired color that is different than a color of the first side of the substrate. In such case, the printing multiple layers of ink in registration with the pattern atop of the first layer of ink can be performed, for example, in seven layers in an embossing finish with ultra-violet curable ink such that the braille indicia has a height of about 0.79 mm, i.e. 1/32 inch, or in fifteen layers in an embossing finish with ultra-violet curable ink such that the braille indicia has a height of about 1.58 mm, i.e. 1/16 inch.

Through the use of the above methods, selectively sized tactile signs with desired braille indicia can be made as well as respective railings having the selectively sized tactile signs affixed thereto.

In accordance with the teachings of the present invention, a selectively sized tactile sign with desired braille includes a flexible substrate and a first layer of ink printed on a first side of the flexible substrate in a pattern defining desired braille indicia. The tactile sign further has multiple layers of ink printed in registration with the pattern atop of the first layer of ink such that the desired braille indicia has a height of at least 1.58 mm, i.e. 1/16 inch, relative to the first side of the substrate and a sealing layer of ink printed atop the substrate and multiple layers of ink such that the braille indicia does not separate from the substrate on a condition that a portion of the substrate bearing the braille indicia is flexed in an arc of a 10 mm, i.e. 7/16 inch, radius circle.

The tactile sign can constructed such that the first layer of ink is an ultra-violet cured ink in a matte finish, the sealing layer of ink is a clear ultra-violet cured ink, and at least one of the multiple layers of ink is an ultra-violet cured ink of a desired color that is different than a color of the first side of the substrate. The substrate can be made of one of a DI-NOC™ architectural finish or a material with equivalent strength and flexibility properties. The substrate can include an adhesive on a second side covered by a removable backing. In such case the tactile sign may take the form of a braille directional identifier where the adhesive is used for affixing the identifier to a railing by removing the backing.

In one example, the first layer of ink is an ultra-violet cured ink in a matte finish, the sealing layer of ink is a clear ultra-violet cured ink, and at least one of the multiple layers of ink is an ultra-violet cured ink of a desired color that is different than a color of the first side of the substrate. The multiple layers of ink may, for example, consist of seven layers of ultra-violet cured in in an embossing finish such that the braille indicia has a height of about 0.79 mm, i.e. 1/32 inch. The multiple layers of ink may consist of fifteen layers of ultra-violet cured ink in an embossing finish such that the braille indicia has a height of about 1.58 mm, i.e. 1/16 inch.

Other objects and advantages of the invention will be apparent to those skilled in the art from the following detailed description and the accompanying drawings.

BRIEF DESCRIPTION OF THE DRAWINGS

FIG. 1 is an elevated view of flexible tactile signs in the form of braille directional identifiers with example braille indicia made in accordance with the teachings of the present invention.

FIG. 2 is an enlarged cross section along line 2-2 of one of the flexible tactile signs shown in FIG. 1.

DETAILED DESCRIPTION OF THE PREFERRED EMBODIMENT(S)

With reference to the drawings, an example flexible tactile signs with braille indicia and the use of such signage is depicted. With reference to FIGS. 1 and 2, a sheet 10 bearing example flexible tactile signs in the form of braille directional identifiers 11, 12 with braille indicia 13 printed thereon is shown. As used herein "braille indicia" includes raised letters and/or symbols which may include braille letters, braille numbers and/or other raised-print symbols.

While two tactile signs 11, 12 are illustrated in FIG. 1, it will be readily apparent to those skilled in the art that many tactile signs may be defined on the sheet 10 during the manufacture of the tactile signs, limited only by the size of the sheet and the respective sizes of the tactile signs. Additionally, the braille indicia of multiple tactile signs printed on the sheet 10 may be the same or different as is the case for the braille directional identifiers 11, 12 which bear different braille indicia. The sheet 10 may be printed with a set of braille directional identifiers bearing respective braille indicia for use at both the top and bottom of railings of a stairwell extending between a first and second floor of a building as well as between other floors.

Figure 3A:
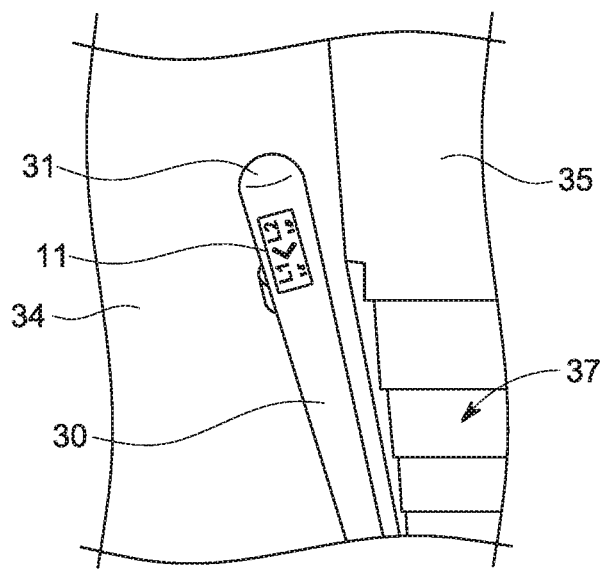
FIG. 3A is a perspective view of an upper end of an example railing having a braille directional identifier in accordance with FIG. 1.
Figure 3B:
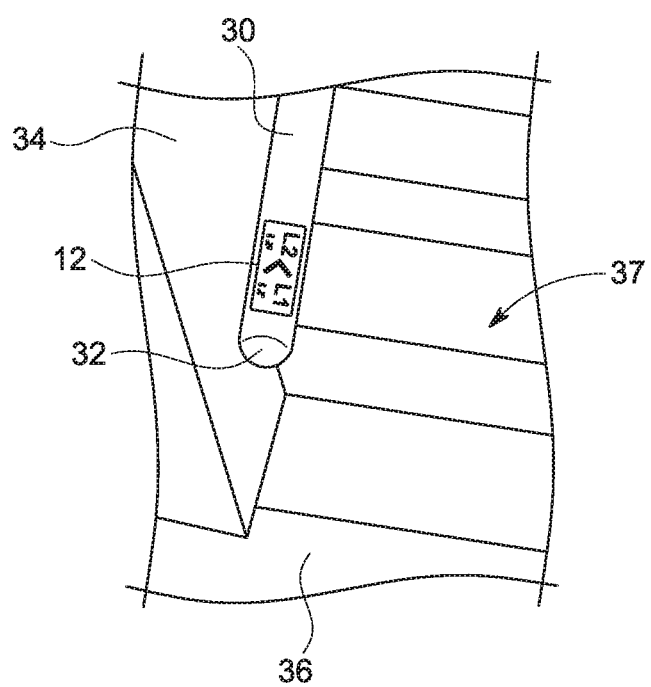
FIG. 3B is a perspective view of a lower end of the example railing of FIG. 3A having a different braille directional identifier in accordance with FIG. 1.

For example, the braille directional identifier 11 may be employed proximate an upper end 31 of a railing 30 leading to a second floor landing 35 of a stairwell 37, as depicted in FIG. 3A. A different braille directional identifier 12 may be employed proximate a lower end 32 of the railing 30 leading from a first floor landing 36 of the stairwell 37, as depicted in FIG. 3B. Both braille directional identifiers 11, 12 along with additional tactile signs with the same or other braille indicia (not shown) may be printed on the same sheet 10.

As best seen in FIG. 2, in the depicted example, the sheet 10 includes a vinyl substrate 14 having an underside 15 coated with a pressure sensitive, acrylic adhesive 16 covered by a silicone coated, poly paper release liner 18. In one example, a Di-Noc™ architectural finish, commercially available from the 3M Company, was used for sheet 10.

The substrate 14 defines the base of the tactile signs 11, 12 and is made of a flexible material of sufficient flexibility, strength and durability characteristics to withstand the wear and tear associated with handrail use by pedestrian traffic on stairwells. A material, such as vinyl, particularly the vinyl used for Di-Noc™ architectural finishes, is suitable that can be readily cut to size without sharp edges and with the ability to hold printed braille indicia and to be affixed to handrail surfaces of various composition.

The sheet 10 can be selectively scored to produce score lines 20 that define the outer edges of the tactile signs 11, 12. This enables the tactile signs 11, 12 to be peeled off of the release liner 18 of the sheet 10 so that the tactile signs 11, 12 can be readily affixed to a railing using the adhesive backing 16. Where the substrate 14 is made of vinyl or the like, scoring or otherwise cutting the substrate to size provides the tactile sign 12 with edges that are not sharp which could otherwise cause injury to persons grasping a handrail with the tactile label applied to it.

As best seen in FIG. 2, the braille indicia 13 of the tactile sign 12 is formed by multiple layers of printing ink. A first layer of ink $PL_1$ is printed in a desired pattern to define the shape of the letters and/or symbols comprising the desired braille indicia 13 on a top surface 17 of the substrate 14. Thereafter, multiple additional layers of ink $PL_2$-$PL_N$ are printed in direct registration above the first ink layer $PL_1$ so that the desired pattern of letters and/or symbols attains a desired height characteristic with respect to the top surface 17 of the substrate 14. A sealing layer of ink $PL_S$ is applied over the substrate 14 as well as the top printed layer $PL_N$. The sealing layer $PL_S$ in conjunction with the type of ink used and flexibility characteristics of the substrate 10 enable the tactile sign to be flexed without separation of any portion of the braille indicia from the flexed substrate 14.

The height of the braille indicia 13 projecting from the top surface 17 of the substrate 14 can be controlled by the number of layers of multiple additional layers of ink $PL_2$-$PL_N$ that are printed on top of the first ink layer $PL_1$. Preferably. the height of the braille indicia 13 projecting from the top surface 17 of the substrate 14 is in the range of 0.025 inch-0.037 inch, i.e. 0.6-0.9 mm, although in some applications it is desirable to have a height greater than that range. As the height is increased, it becomes more difficult to assure that the raised braille indicia 13 does not separate from the substrate 14 or become damaged when the flexible tactile sign is bent.

In one example, the braille indicia 13 was formed by using multiple layers of ultra violet (UV) curable gloss ink. The first layer $PL_1$ was printed on the substrate 14 of the tactile sign 12 with UV gloss ink, but with a matte varnish finish. Next, six layers $PL_2$-$PL_7$ were printed with UV gloss ink with an embossing finish in the same pattern as the first layer $PL_1$. The six layers $PL_2$-$PL_7$ were printed in a single printing stage. An eighth layer $PL_8$, the Nth layer in this case, was then printed with colored UV gloss ink in the same pattern as the first layer $PL_1$. Finally, a sealing tenth layer $PL_S$ was printed with a clear UV gloss ink with an embossing finish over the tactile sign substrate 14 as well as the braille indicia defined by the previously applied layers $PL_1$-$PL_8$ of UV cured ink.

The application of the eight layers $PL_1$-$PL_8$ of ink resulted in the braille indicia having a height of 0.79 mm, i.e. 1/32 inch, with respect to the top surface 17 of the substrate 14, which relative height was maintained with the application of the sealing layer $PL_S$. A braille indicia height of at least 0.79 mm, i.e. 1/32 inch, is preferably the minimum height for the tactile signs in the form of braille directional identifiers.

Clear ECO-UV, EUV-GL Ver. 2 printing ink commercially available from Roland DGA Corporation of Japan was used in the example for the first seven layers $PL_1$-$PL_7$ and the sealing layer $PL_S$. In that example, a Di-Noc™ architectural finish having a grey top surface 17 was used for the substrate 14 and black ECO-UV, EUV-BK Ver. 2 printing ink commercially available from Roland DGA Corporation of Japan was used in the example for the eighth layer $PL_8$. Since clear ink was employed for the sealing layer $PL_S$, the black UV gloss ink of the sixteenth layer $PL_{16}$ provided color contrast with the grey substrate to enable the braille indicia 13 to be readily apparent to sighted persons. In general, the printing of at least one of the multiple layers of ink can be performed with an ink of a desired color that is different than a color of the top surface of the substrate to provide the color contrast function when color contrast is desired.

In another example, the braille indicia 13 was also formed by using multiple layers of ultra violet (UV) curable gloss ink. The first layer $PL_1$ was printed on the substrate 14 of the tactile sign 12 with UV gloss ink, but with a matte varnish finish. Next, fourteen layers $PL_2$-$PL_{15}$ were printed with UV gloss ink with an embossing finish in the same pattern as the first layer $PL_1$. Due to the limitations of the printing equipment, the fourteen layers $PL_2$-$PL_{15}$ were printed in two stages of seven layers each. A sixteenth layer $PL_{16}$, the Nth layer in this case, was then printed with colored UV gloss ink in the same pattern as the first layer $PL_1$. Finally, a sealing seventeenth layer $PL_S$ was printed with a clear UV gloss ink with an embossing finish over the tactile sign substrate 14 as well as the braille indicia defined by the previously applied layers $PL_1$-$PL_{16}$ of UV cured ink.

The application of the sixteen layers $PL_1$-$PL_{16}$ of ink resulted in the braille indicia having a height of 1.58 mm, i.e. $\frac{1}{16}$ inch, with respect to the top surface 17 of the substrate 14 which relative height was maintained with the application of the sealing layer $PL_S$.

Clear ECO-UV, EUV-GL Ver. 2 printing ink commercially available from Roland DGA Corporation of Japan was used in the example for the first fifteen layers $PL_1$-$PL_{15}$ and the sealing layer $PL_S$. In that example, a Di-Noc™ architectural finish having a grey top surface 17 was used for the substrate 14 and black ECO-UV, EUV-BK Ver. 2 printing ink commercially available from Roland DGA Corporation of Japan was used in the example for the sixteenth layer $PL_{16}$. Since clear ink was employed for the sealing layer $PL_S$, the black UV gloss ink of the sixteenth layer $PL_{16}$ provided color contrast with the grey substrate to enable the braille indicia 13 to be readily apparent to sighted persons.

In both the 0.79 mm, i.e. $\frac{1}{32}$ inch, high braille indicia example and the 1.58 mm, i.e. $\frac{1}{16}$ inch, high braille indicia example above, the flexible tactile signs were able to be affixed to a 20 mm, i.e. $\frac{7}{8}$ inch, diameter shaft without any separation of the braille indicia from the substrate or other damage to the signage. In other words, the tactile signs are made such that the braille indicia does not separate from the substrate on which the braille indicia is printed when the braille indicia is flexed in an arc of a 10 mm, i.e. $\frac{7}{16}$ inch, radius circle. Accordingly, the flexible tactile signs in the form of braille directional identifiers are usable with virtually any type of conventional stairwell railings.

Example usage of the flexible tactile signs is illustrated in FIGS. 3A and B. In this example, a railing 30 attached to a stairwell wall 34 for a stairwell 37 extends down from a second floor landing 35 to a first floor landing 36 of a structure. In FIG. 3A, the braille directional identifier 11 (shown in FIG. 1) has been removed from the sheet 10 and affixed to the railing 30 proximate its second floor upper end 31 to indicate that the railing 30 extends from the second floor to the first floor. In FIG. 3B, the braille directional identifier 12 (shown in FIG. 1) is affixed to the railing 30 proximate its first floor lower end 32. The braille directional identifier 12 includes braille indicia 13 that indicates that the railing 30 extends from the first floor to the second floor.

Although the invention was disclosed with respect to particular examples, the examples are non-limiting. The number and type of tactile signs printed on a sheet may vary in accordance with the needs of a particular installation site. The manner of affixation of the tactile signs may vary. Additionally, the use of the disclosed tactile signage is not limited to stairway railings or the like.

What is claimed is:

1. A method of providing braille indicia signage for application to staircase railings proximate ends of staircases extending in vertical directions from levels of a multilevel structure comprising:
   providing a flexible substrate having an adhesive backing and an associated release liner;
   printing a first layer of ink on a side of the flexible substrate opposite the adhesive backing in a pattern to define a plurality of braille indicia that each include a braille directional identifier including an identification of a respective level and a respective vertical direction from which a respective staircase extends;
   printing multiple layers of ink in registration with the pattern atop of the first layer of ink such that the braille indicia has a height of at least 0.79 mm relative to the first side of the substrate;
   printing a sealing layer of ink atop the substrate and multiple layers of ink;
   forming a corresponding plurality of selectively sized flexible tactile signs by selectively cutting the sealing layer and the substrate around each of the braille indicia such that each of the braille indicia does not separate from the substrate on a condition that a portion of the its corresponding selectively sized flexible tactile sign bearing the braille indicia is flexed in an arc of a 10 mm radius circle.

2. The method of claim 1 wherein:
   the printing of the first layer of ink is performed in a matte finish with ultra-violet curable ink, and
   the printing the multiple layers of ink and the printing the sealing layer of ink are performed with ultra-violet curable ink in an embossing finish.

3. The method of claim 2 wherein the printing multiple layers of ink in registration with the pattern atop of the first layer of ink is performed in seven layers such that the braille indicia has a height of about 0.79 mm.

4. The method of claim 2 wherein the printing multiple layers of ink in registration with the pattern atop of the first layer of ink is performed in fifteen layers such that the braille indicia has a height of at least 1.58 mm.

5. The method of claim 1 further comprising affixing the each selectively sized flexible tactile sign proximate an end of a respective staircase railing of a respective staircase to thereby provided visually impaired persons with an indication of the vertical direction and level from the respective staircase extends by removing the selectively sized flexible tactile sign from a respective portion of the release liner and using a respective portion of the adhesive backing to affix the selectively sized flexible tactile sign.

6. The method of claim 5 wherein the substrate is made of one of a DI-NOC™ architectural finish or a material with equivalent strength and flexibility properties.

7. The method of claim 6 wherein the printing of the first layer of ink is performed in a matte finish with ultra-violet curable ink, the printing of the sealing layer of ink is performed with a clear ink, and the printing of at least one of the multiple layers of ink is performed with an ink of a desired color that is different than a color of the first side of the substrate.

8. The method of claim 7 wherein the printing multiple layers of ink in registration with the pattern atop of the first layer of ink is performed in seven layers in an embossing finish with ultra-violet curable ink such that the braille indicia has a height of about 0.79 mm.

9. The method of claim 7 wherein the printing multiple layers of ink in registration with the pattern atop of the first layer of ink is performed in fifteen layers in an embossing finish with ultra-violet curable ink such that the braille indicia has a height of at least 1.58 mm.

10. A plurality of selectively sized flexible tactile signs with braille indicia made in accordance with claim 1 that include a first flexible tactile sign having braille indicia indicating an upward direction from a first level to a second level, that is higher than the first level, and a second flexible tactile sign having braille indicia indicating a downward direction from the second level to the first level.

11. A staircase railing extending between the first and second levels having the first and second selectively sized flexible tactile signs of claim 10 with their respective portions of the release liner removed affixed proximate respective ends thereof.

12. A plurality of selectively sized flexible tactile signs with braille indicia made in accordance with claim 1 that include a first flexible tactile sign having braille indicia indicating an upward direction from a first level to a second level, that is higher than the first level, and a second flexible tactile sign having braille indicia indicating a downward direction from the second level to the first level wherein the printing multiple layers of ink in registration with the pattern atop of the first layer of ink is performed in fifteen layers such that the braille indicia has a height of at least 1.58 mm.

13. A staircase railing extending between the first and second levels having the first and second selectively sized flexible tactile signs of claim 12 with their respective portions of the release liner removed affixed proximate the respective ends thereof.

14. A method of providing braille indicia signage for application to staircase railings proximate ends of staircases extending in vertical directions from levels of a multilevel structure comprising:
providing a flexible substrate having an adhesive backing and an associated release liner;
printing a first layer of ink on a side of the flexible substrate opposite the adhesive backing in a pattern to define a plurality of braille indicia that each include a braille directional identifier including an identification of a respective level and a respective vertical direction from which a respective staircase extends;
printing multiple layers of ink in registration with the pattern atop of the first layer of ink such that the braille indicia has a height of at least 0.79 mm relative to the first side of the substrate;
printing a sealing layer of ink atop the substrate and multiple layers of ink;
forming a corresponding plurality of selectively sized flexible tactile signs by selectively cutting the sealing layer and the substrate around each of the braille indicia.

15. The method of claim 14 wherein:
the printing of the first layer of ink is performed in a matte finish with ultra-violet curable ink, and
the printing the multiple layers of ink and the printing the sealing layer of ink are performed with ultra-violet curable ink in an embossing finish.

16. The method of claim 15 wherein the printing multiple layers of ink in registration with the pattern atop of the first layer of ink is performed in fifteen layers such that the braille indicia has a height of at least 1.58 mm.

17. The method of claim 14 further comprising affixing the each selectively sized flexible tactile sign proximate an end of a respective staircase railing of a respective staircase to thereby provided visually impaired persons with an indication of the vertical direction and level from the respective staircase extends by removing the selectively sized flexible tactile sign from a respective portion of the release liner and using a respective portion of the adhesive backing to affix the selectively sized flexible tactile sign.

18. The method of claim 14 wherein the printing of the first layer of ink is performed in a matte finish with ultra-violet curable ink, the printing of the sealing layer of ink is performed with a clear ink, and the printing of at least one of the multiple layers of ink is performed with an ink of a desired color that is different than a color of the first side of the substrate.

19. A plurality of selectively sized flexible tactile signs with braille indicia made in accordance with claim 14 that include a first flexible tactile sign having braille indicia indicating an upward direction from a first level to a second level, that is higher than the first level, and a second flexible tactile sign having braille indicia indicating a downward direction from the second level to the first level.

20. A staircase railing extending between the first and second levels having the first and second selectively sized flexible tactile signs of claim 19 with their respective portions of the release liner removed affixed proximate respective ends thereof.

* * * * *